(12) United States Patent
Yin et al.

(10) Patent No.: US 11,240,460 B2
(45) Date of Patent: Feb. 1, 2022

(54) BIOMETRIC SENSING SYSTEM AND SENSING METHOD THEREOF

(71) Applicant: Guangzhou Tyrafos Semiconductor Technologies Co., Ltd., Guangzhou (CN)

(72) Inventors: Ping-Hung Yin, Taipei (TW); Jia-Shyang Wang, Miaoli County (TW)

(73) Assignee: Guangzhou Tyrafos Semiconductor Tech. Co., Ltd., Guangzhou (CN)

( * ) Notice: Subject to any disclaimer, the term of this patent is extended or adjusted under 35 U.S.C. 154(b) by 0 days.

(21) Appl. No.: 17/093,709

(22) Filed: Nov. 10, 2020

(65) Prior Publication Data
US 2021/0174054 A1     Jun. 10, 2021

Related U.S. Application Data

(60) Provisional application No. 62/945,250, filed on Dec. 9, 2019.

(51) Int. Cl.
*G06K 9/00* (2006.01)
*H04N 5/378* (2011.01)
*H04N 5/3745* (2011.01)

(52) U.S. Cl.
CPC .......... *H04N 5/378* (2013.01); *G06K 9/0004* (2013.01); *G06K 9/0012* (2013.01); *G06K 9/00033* (2013.01); *G06K 9/00046* (2013.01); *G06K 9/00087* (2013.01); *G06K 9/00919* (2013.01); *H04N 5/37455* (2013.01)

(58) Field of Classification Search
None
See application file for complete search history.

(56) References Cited

U.S. PATENT DOCUMENTS

2021/0042494 A1* 2/2021 Xie ..................... G06K 9/00107

* cited by examiner

*Primary Examiner* — Joseph R Haley
(74) *Attorney, Agent, or Firm* — Lin & Associates Intellectual Property, Inc.

(57) ABSTRACT

The invention relates to a biometric sensing system, comprising: a light emitter, a polarization sensor, and a signal processing module, wherein the polarization sensor includes a first polarizer and a second polarizer. First, the light emitter emits a plurality of emitted light from the object under sensing, and reflected by the object. Then, a first reflected light in a first polarization direction and a second reflected light in a second polarization direction in the reflected light are sensed by the polarization sensor. Finally, the signal processing module calculates a first reflectance and a second reflectance according to the first reflected light and the second reflected light, and generate a reflectance ratio based on the first reflectance and the second reflectance. As such, the user determines whether the surface of the object under sensing is 3D by the reflectance ratio, so as to achieve improving safety and saving costs.

19 Claims, 11 Drawing Sheets

BIOMETRIC SENSING SYSTEM AND SENSING METHOD THEREOF

CROSS-REFERENCE TO RELATED APPLICATION

This application claims the priority of U.S. provisional application No. 62/945,250, filed on Dec. 9, 2019, which is incorporated herewith by reference.

BACKGROUND OF THE INVENTION

1. Field of the Invention

The present invention relates generally to an optical sensing system, and more particularly, to a biometric sensing system based on polarization.

2. The Prior Arts

The rapid development of fingerprint recognition technology has made the fingerprint recognition a standard feature of most smart phones. The advantage of fingerprint recognition is that the fingerprint is unique, and the complexity of the fingerprint is sufficient for identification. In addition, when the additional reliability is necessary, it only needs to register more fingerprints to identify more fingers, up to ten, and each fingerprint is unique. Furthermore, scanning fingerprints nowadays is fast and easy to use, which is also one of the main reasons that fingerprint recognition technology has such a huge market share.

However, fingerprint recognition is not absolutely secure. People leave their fingerprints in many public places every day. Someone else with malicious intention can easily obtain a copy of fingerprint. Once fingerprints are restored, personal devices and information security may be stolen. Also, compared to password, the password can still be reset even after being cracked, but the fingerprint cannot be reset. Therefore, how to improve the security and recognition ability of fingerprint recognition is one of the problems that must be solved.

Therefore, after observing the above-mentioned deficiencies, the inventors of the present case proposed the present invention.

SUMMARY OF THE INVENTION

A primary objective of the present invention is to provide a biometric sensing system, the emitted light emitted by the light emitter of the biometric sensing system is a non-polarized emission light, and the polarization sensor senses a first reflected light in a first polarization direction and a second reflected light in a second polarization direction in the reflected light, thereby eliminating noise in the environment and increasing the contrast of the fingerprint image. In addition, because the emitted light from the light emitter is any non-polarized emission light, the biometric sensing system according to the present invention can achieves the effects of low cost and wide applicability.

Another objective of the present invention is to provide a biometric sensing system, wherein the biometric sensing system uses a signal processing module to calculate a first reflectance and a second reflectance and generate a reflectance ratio according to the first reflectance and the second reflectance, and determine whether the object under sensing is three-dimensional according to whether the reflectance ratio changes, so as to effectively prevent others from cracking the fingerprint recognition system with an image or picture of the fingerprint, and greatly increase the security and recognition capabilities of the fingerprint recognition system.

To achieve the above objectives, the present invention provides a biometric sensing system, which comprises: a light emitter, emitting at least one emitted light to an object under sensing, and the at least one emitted light reflected by the object under sensing to generate at least one reflected light, wherein the at least one reflected light comprising: a first reflected light having a first polarization direction and a second reflected light having a second polarization direction; a polarization sensor, electrically connected to the light emitter, the polarization sensor receiving the first reflected light in the first polarization direction and the second reflected light in the second polarization direction in the reflected light, and converting into a plurality of sensing signals, wherein a first reflection angle existing between the first reflected light and the object under sensing, and a second reflection angle between the second reflected light and the object under sensing; and a signal processing module, coupled to the light emitter and the polarization sensor, and the signal processing module calculating a first reflectance of the first reflected light and a second reflectance of the second reflected light according to the sensing signals, and generating a reflectance ratio according to the first reflectance and the second reflectance; wherein, the first reflectance being related to the first reflection angle, and the second reflectance being related to the second reflection angle.

Preferably, according to the biometric sensing system of the present invention, the light emitter comprises a plurality of light emitting units, and the light emitting units are arranged along a first direction.

Preferably, according to the biometric sensing system of the present invention, the light emitter comprises a plurality of light emitting units, and the light emitting units are arranged in an array along a first direction and a second direction.

Preferably, according to the biometric sensing system of the present invention, the light emitting unit comprises a first light emitting unit and a second light emitting unit.

Preferably, according to the biometric sensing system of the present invention, when the first reflectance and the second reflectance vary with the first reflection angle and the second reflection angle, the signal processing mode determines that the surface of the object under sensing is three-dimensional, otherwise, the signal processing module determines that the surface of the object under sensing is planar.

Preferably, according to the biometric sensing system of the present invention, the first polarization direction is perpendicular to the second polarization direction.

Preferably, according to the biometric sensing system of the present invention, the light emitter uses a laser beam or an LED beam to emit the emitted light, but the present invention is not limited to the above.

Preferably, according to the biometric sensing system of the present invention, the light emitter emits a visible light of wavelength between 360 nm and 860 nm, but the present invention is not limited to the above.

Preferably, according to the biometric sensing system of the present invention, the light emitter emits a laser beam of wavelength between 860 nm and 1350 nm, and the light emitter is a pulse light emitter or a laser diode, but the present invention is not limited to the above.

Preferably, according to the biometric sensing system of the present invention, the polarizing sensor comprises a first polarizer and a second polarizer; the first polarizer and the second polarizer are arranged in a staggered layout, the first polarizer and the second polarizer are made of one of birefringent crystals or metal gratings, but the present invention is not limited thereto.

Preferably, according to the biometric sensing system of the present invention, the first polarization direction is perpendicular to the second polarization direction, but the present invention is not limited to the above.

Preferably, in a preferred embodiment of the present invention, the light emitter uses a surface-emitting laser (VCSEL) to reduce the directivity to achieve increasing the projection coverage range.

Preferably, according to the biometric sensing system of the present invention, the signal processing module is one of a server, a computer, and an integrated circuit, but the present invention is not limited to the above.

In addition, in order to achieve the above objectives, the present invention, applicable to the above biometric sensing system, further provides a method for executing a biometric sensing system, which comprises: the light emitter of the biometric sensing system emitting the at least one emitted light to the object under sensing; after the at least one emitted light being reflected by the object under sensing, generating at least one reflected light, wherein the at least one reflected light comprises the first reflected light in the first polarization direction and the second reflected light in the second polarization direction; the polarization sensor receiving the first reflected light in the first polarization direction and the second reflected light in the second polarization direction in the reflected light and converting into a plurality of sensing signals; the signal processing module calculating the first reflectance of the first reflected light and the second reflectance of the second reflected light according to the sensing signals, and generating a reflectance ratio based on the first reflectance and the second reflectance; when the reflectance ratio changing with the surface of the object under sensing, the signal processing module determining the surface of the object under sensing being three-dimensional; on the other hand, the signal processing module determining that the surface of the object under sensing being planar; wherein, the first reflectance being related to the first reflection angle, and the second reflectance being related to the second reflection angle.

Preferably, according to the biometric sensing system of the present invention, the polarization sensor is used to sense the first reflected light in the first polarization direction and the second reflected light in the second polarization direction in the reflected light, because the reflected light in a different polarization direction has a different reflectance, the biometric sensing system only receives the reflected light in a specific direction, thereby effectively eliminating noise in the environment and increasing the contrast of the fingerprint image, but the present invention is not limited to the above.

In addition, according to the biometric sensing system of the present invention, the polarization sensor senses the first reflected light in the first polarization direction and the second reflected light in the second polarization direction in the reflected light, and determines whether the object under sensing is three-dimensional by the change in the reflectance ratio. As such, it effectively prevents others from cracking the fingerprint recognition system with fingerprint images or pictures, and greatly increases the security and recognition ability of the fingerprint recognition system.

Preferably, according to the biometric sensing method of the present invention, the method further comprises a step of: when the signal processing module determining that the object under sensing is planar, a second light emitting unit is activated to emit at least one emitted light to the object under sensing.

The biometric sensing system and the sensing method provided by the present invention mainly utilize the polarization sensor which only receives reflected light in a specific direction, to effectively eliminate the influence of background noise caused by natural light in the environment, and determine whether the object under sensing is three-dimensional by the change of the reflectance, so as to achieve accuracy, security and cost-saving.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

The terms used herein are only used to illustrate specific embodiments, and are not intended to limit the present invention. Unless the context clearly indicates otherwise, the singular terms "a" and "the" used herein are intended to also include the plural. The term "and/or" as used herein includes any and all combinations of one or more of the related listed items. It should be understood that when an element is referred to as being "connected" or "coupled" to another element, the element may be directly connected or coupled to the other element or intervening elements may be present.

It should also be understood that although the terms "first", "second", "third", etc. may be used herein to describe various elements, these elements should not be limited to these terms. These terms are only used to distinguish each element. Therefore, the first element in some embodiments may be referred to as the second element in other embodiments, and this does not depart from the teachings of the present invention. The exemplary embodiments of the aspects of the inventive concept illustrated and described herein include their complementary counterparts. Throughout this specification, the same reference number or the same indicator represents the same element.

Figure 1:
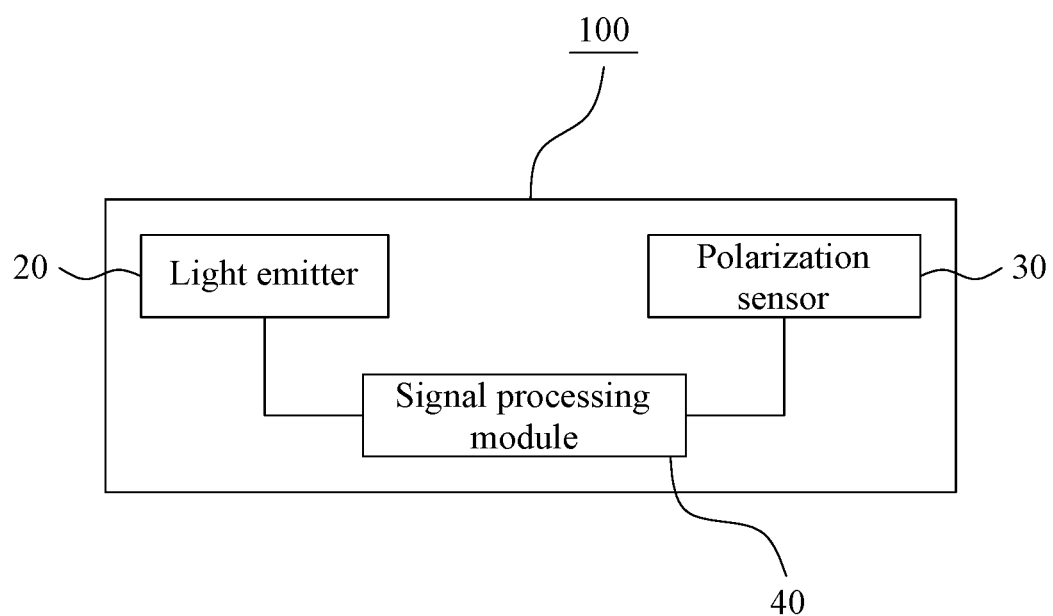
FIG. 1 is a schematic view illustrating a biometric sensing system according to a first embodiment of the present invention.
Figure 2:
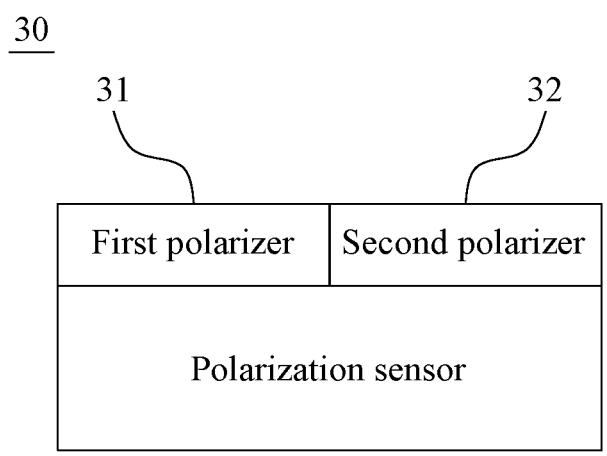
FIG. 2 is a schematic view illustrating the polarization sensor of the first embodiment of the present invention.
Figure 3:
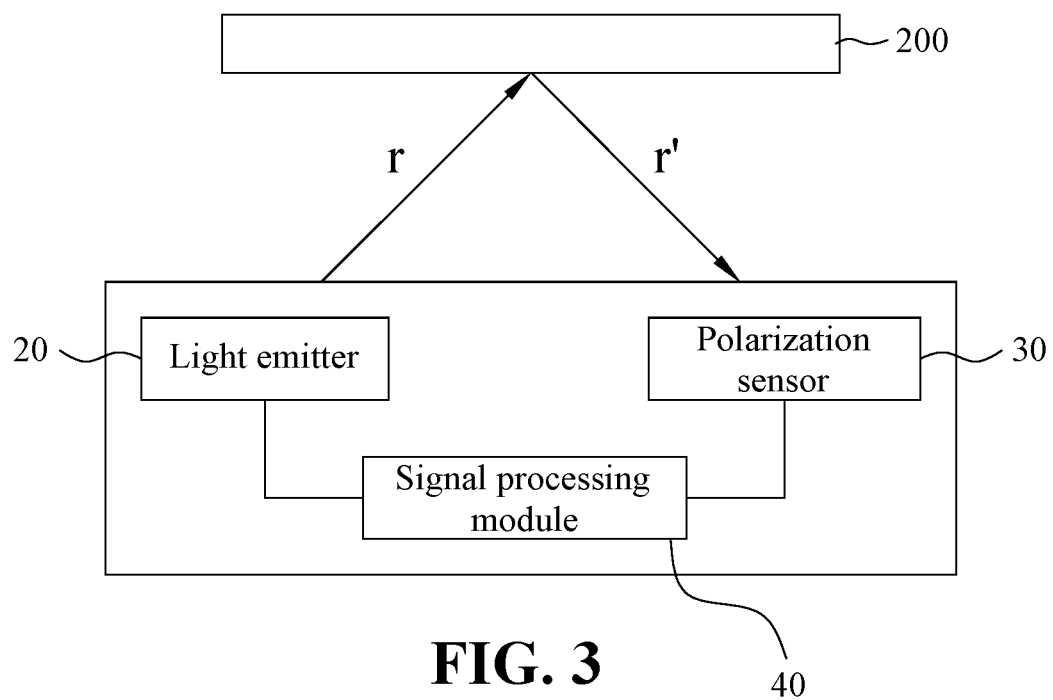
FIG. 3 is a schematic view illustrating the position of the biometric sensing system according to the first embodiment of the present invention.

Referring to FIG. 1 and FIG. 2, FIG. 1 is a schematic view illustrating a biometric sensing system according to a first embodiment of the present invention; FIG. 2 is a schematic view illustrating the polarization sensor of the first embodiment of the present invention. As shown in FIG. 1, the biometric sensing system 100 according to the present invention includes: a light emitter 20, a polarization sensor 30 and a signal processing module 40.

Specifically, the biometric sensing system 100 according to the present invention can be applied to fingerprint recognition, face recognition, etc., but the present invention is not limited to the above.

Specifically, the light emitter 20 according to the present invention emits at least one emission light r to the object 200 under sensing. It should be further understood that the light emitter can use a laser beam or an LED beam as the emitted light r, so the wavelength of the emitted light r emitted by the light emitter 20 can be between 360 nm and 1550 nm, for example, the emitted light r can be 495 nm, 650 nm, 850 nm, 940 nm, 1300 nm, 1310 nm, 1350 nm, etc., but the present invention is not limited thereto.

Further, since the wavelength of the laser used for identification in general smart phones is 940 nm, and infrared lasers of this wavelength have also been medically proven to be harmful to the human eye, causing cataracts and retinal burns; in contrast, the laser beams that can be used in the present invention have a wavelength of 1310 nm, which is harmless to the user's eyes.

It is worth mentioning that in the present embodiment, the emitted light r emitted by the light emitter 20 may not be polarized light with a specific polarization direction, but any arbitrary light beam without polarization may be used as the emitted light. In other words, the emitted light r according to the first embodiment of the present invention does not need to be limited to any specific emitted light, so it can effectively reduce the cost and improve the applicability of the present invention.

Specifically, as shown in FIG. 2, the polarization sensor 30 according to the present invention further includes a first polarizer 31 and a second polarizer 32. Wherein, the first polarizer 31 and the second polarizer 32 may be arranged in a staggered arrangement, but the present invention is not limited to this arrangement. In addition, the first polarizer 31 and the second polarizer 32 can be made of one of birefringent crystals or metal gratings, but the present invention is not limited thereto.

It is worth mentioning that, in the present embodiment, when the first polarizer 31 and the second polarizer 32 are metal gratings, the distance between the metal lines and the metal lines in the metal grating can be smaller than one half of the wavelength of the emitted light r emitted by the light emitter 20, but the present invention is not limited to above.

Figure 4A:
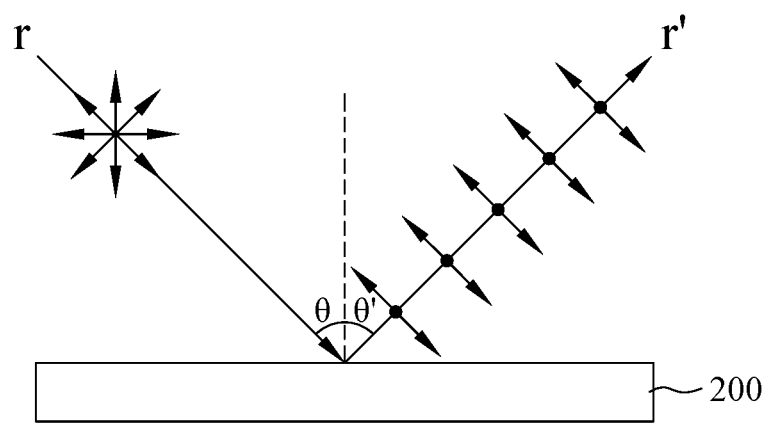
FIG. 4A is a schematic view illustrating incident light and reflected light of the first embodiment of the present invention.
Figure 4B:
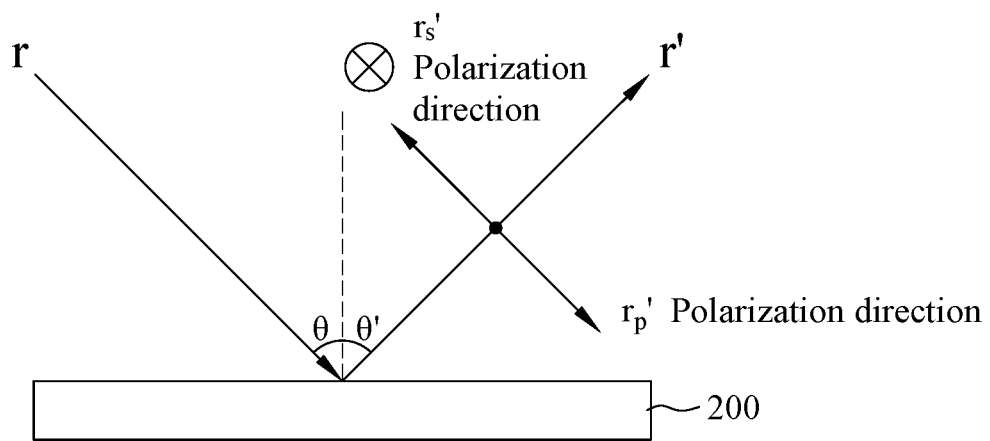
FIG. 4B is a schematic view illustrating the polarization directions of the first incident light and the second incident light in the first embodiment of the present invention.

Refer to FIGS. 4A and 4B as well as FIGS. 1 and 2. FIG. 4A is a schematic view illustrating incident light and reflected light of the first embodiment of the present invention; FIG. 4B is a schematic view illustrating the polarization directions of the first incident light and the second incident light in the first embodiment of the present invention. Specifically, the polarization sensor 30 according to the present invention is electrically connected to the light transmitter 20, and the polarization sensor 30 receives the first reflected light $r_s'$ with the first polarization direction and the second reflected light $r_p'$ in the second polarization direction in the reflected light r' and converts into a plurality of sensing signal (not shown).

Specifically, the signal processing module 40 according to the present invention is coupled to the light emitter 20 and the polarization sensor 30, and the signal processing module 40 calculates a first reflectance $R_s$ of the first reflected light $r_s'$ and the second reflectance $R_p$ of the second reflected light $r_p'$ according to the sensing signals, and the reflectance ratio P between the first reflectance $R_s$ and the second reflectance $R_p$ (not shown), wherein the signal processing module 40 can be one of a server, a computer, or an integrated circuit, but the invention is not limited to the above.

Figure 4C:
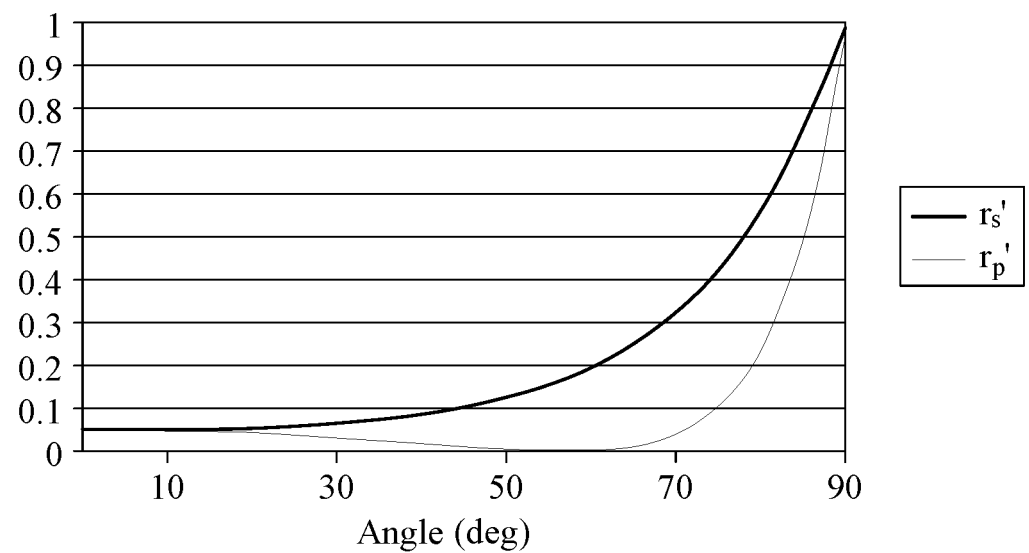
FIG. 4C is a schematic view illustrating the relationship between reflectance and incident angle of the first embodiment of the present invention.

It should be further understood that, as shown in FIG. 4C in conjunction with FIGS. 4A and 4B, FIG. 4C is a schematic view illustrating the relationship between reflectance and incident angle of the first embodiment of the present invention. In the present embodiment, the first polarization direction is perpendicular to the incident direction, and the second polarization direction is parallel to the incident direction. However, the present invention is not limited to the above. It can be deduced by calculation that the first reflectance $R_s$ of the first reflected light $r_s'$ and the second reflectance $R_p$ of the second reflected light $r_p'$ meet the following formula (1) and formula (2). In the present embodiment, $\Theta_i$ is the incident angle θ of the incident light, and $\theta_r$ is the reflection angle. Referring to FIG. 4C, formula (1) and formula (2), the first reflectance $R_s$ and the second reflectance $R_p$ are related to the incident angle θ of the incident light r, and from the formula (3), the reflectance ratio P is the ratio of the first reflectance $R_s$ and the second reflectance $R_p$. Therefore, when the first reflectance $R_s$ and the second reflectance $R_p$ change with the incident angle θ, the reflectance ratio P changes with the incident angle θ. In detail, the reflected light r' with different incident angles θ will have a different reflectance ratio P, resulting in the different reflectance ratio P of the reflected light r' generated after the same incident light r is emitted to the object under sensing 200. A change in reflectance ratio indicates that the incident angle θ of the reflected light r' has also changed, thereby determining that the object under sensing has a three-dimensional surface.

$$R_s = \left[\frac{\sin(\theta_i - \theta_r)}{\sin(\theta_i + \theta_r)}\right]^2 \qquad \text{formula (1)}$$

$$R_p = \left[\frac{\tan(\theta_i - \theta_r)}{\tan(\theta_i + \theta_r)}\right]^2 \qquad \text{formula (2)}$$

$$P = \frac{R_s}{R_p} \qquad \text{formula (3)}$$

Figure 5:
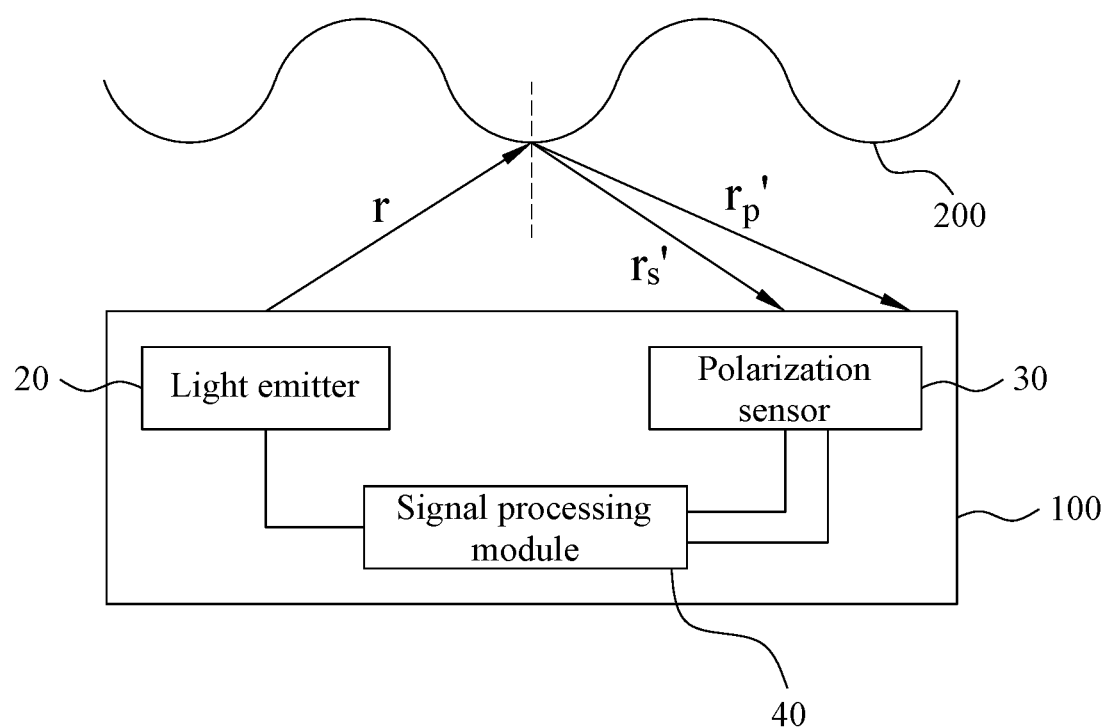
FIG. 5 is a schematic view of the biometric sensing system of the first embodiment of the present invention recognizing the surface of a three-dimensional object under sensing.

Referring to FIG. 5, FIG. 5 is a schematic view of the biometric sensing system of the first embodiment of the present invention recognizing the surface of a three-dimensional object under sensing. As shown in FIG. 5, since the fingerprint of the human hand is three-dimensional, the same incident light will produce different incident angles on the three-dimensional surface. With the above derivation, it can be seen that the reflected light r' with a different incident angle θ has a different reflectance ratio P. Therefore, the biometric sensing system 100 of the present invention can use the signal processing module 40 to calculate the reflectance ratio P generated by the first reflectance $R_s$ and the second reflectance $R_p$, so as to determine whether the reflectance ratio P varies with the surface of the object under sensing 200, that is, whether the reflected light r' has a different incident angle θ, so that the biometric sensing system 100 determines whether the surface of the object under sensing 200 is three-dimensional. In the present embodiment, the biometric sensing system 100 can confirm whether the object 200 is a real fingerprint. In this way, the present invention effectively prevents others from cracking the fingerprint recognition system with fingerprint images or pictures, and greatly increases the security and recognition capabilities of the fingerprint recognition system.

It is worth noting that although the above description is based on the first polarization direction perpendicular to the incident direction and the second polarization direction parallel to the incident direction, the present invention is not limited to the above. In the environment, the fingerprint image is often disturbed by ambient light, causing the fingerprint image to be blurred. However, because the reflected light r' in different polarization directions has different reflectance R, the user can select the specific first polarizer 31 and second polarizer 32 to filter out the reflected light r' with a smaller reflectance R, thereby effectively eliminating noise in the environment and increasing the contrast of fingerprint images.

Figure 6:
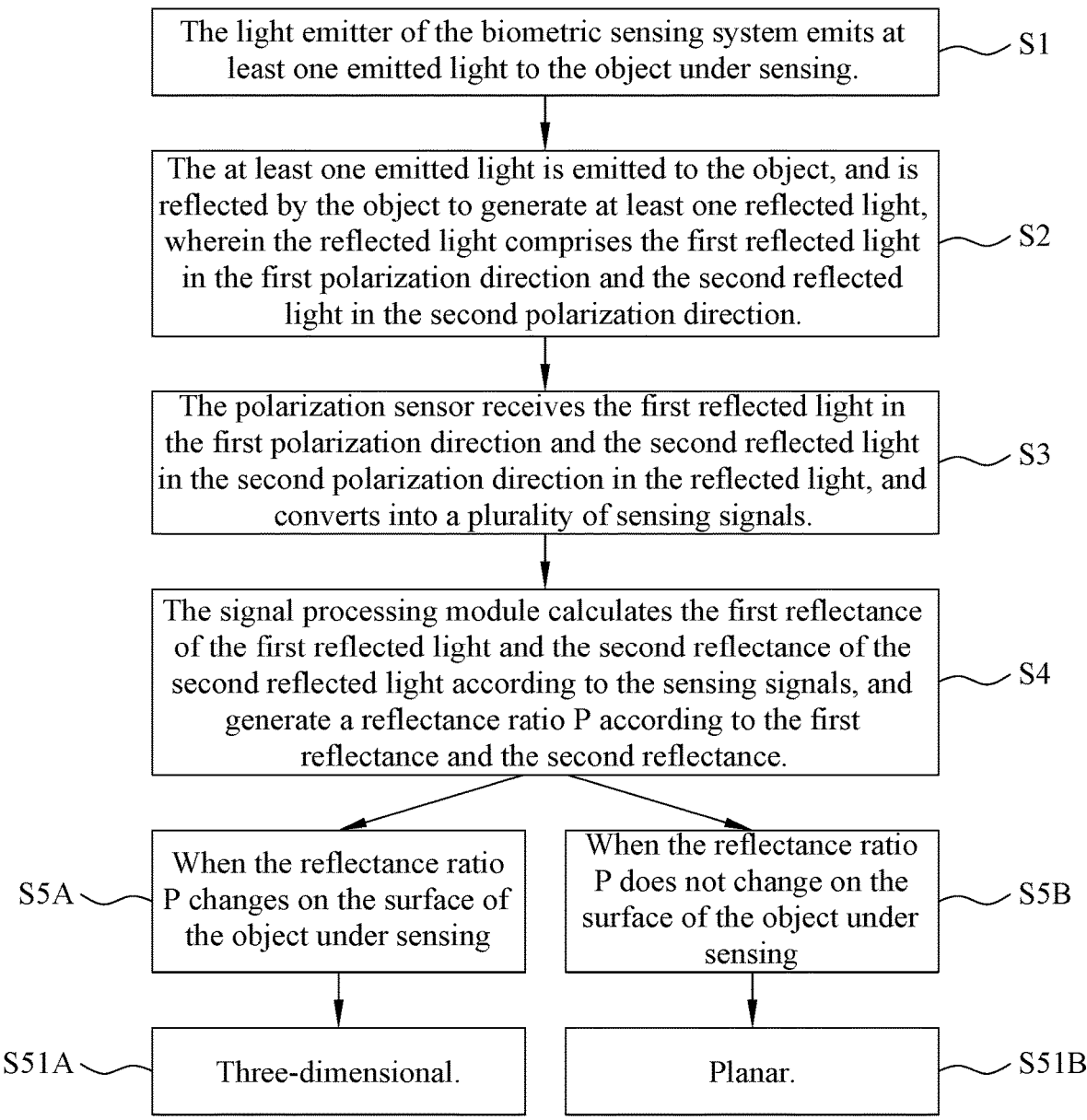
FIG. 6 is a flowchart illustrating the steps of performing the sensing method of the biometric sensing system according to the first embodiment of the present invention.

Referring to FIG. 6, FIG. 6 is a flowchart illustrating the steps of performing the sensing method of the biometric sensing system according to the first embodiment of the present invention. The present invention is based on the biometric sensing system 100 of the first embodiment, and further provides a sensing method of the biometric sensing system 100, which includes the following steps:

Step S1: The light emitter 20 of the biometric sensing system 100 emits at least one emitted light r to the object under sensing 200. The light emitter can use a laser beam or an LED beam as the emitted light r, so the wavelength of the emitted light r emitted by the light emitter 20 may be between 360 nm and 1550 nm.

Step S2: The at least one emitted light r is emitted to the object 200, and is reflected by the object 200 to generate at least one reflected light r', wherein the reflected light r' comprises the first reflected light $r_s'$ in the first polarization direction and the second reflected light $r_p'$ in the second polarization direction. In the present embodiment, the first polarization direction is perpendicular to the incident direction, and the second polarization direction is parallel to the incident direction. However, the present invention is not limited to the above.

Step S3: The polarization sensor 30 receives the first reflected light $r_s'$ in the first polarization direction and the second reflected light $r_p'$ in the second polarization direction in the reflected light r', and converts the first reflected light $r_s'$ and the second reflected light $r_p'$ into a plurality of sensing signals.

Step S4: The signal processing module 40 calculates the first reflectance $R_s$ of the first reflected light and the second reflectance $R_p$ of the second reflected light according to the sensing signals, and generate a reflectance ratio P according to the first reflectance $R_s$ and the second reflectance $R_p$, wherein the first reflectance $R_s$ and the second reflectance $R_p$ are related to the incident angle θ.

Step S5A: The changes in the reflectance ratio P indicate a change in the incident angle θ of the emitted light r.

Step S51A: The signal processing module 40 determines that the object 200 is three-dimensional.

Step S5B: A constant reflectance ratio P indicates that the incident angle θ of the incident light r does not change.

Step S51B: The signal processing module 40 determines that the object 200 is planar.

Accordingly, it can be seen from the above description that the biometric sensing system 100 provided by the present invention and sensing method thereof utilize the correlation between the first reflectance $R_s$, the second reflectance $R_p$, and the incident angle θ of the incident light r, and the reflectance ratio P varies with the incident angle θ, so that after the same incident light r is emitted to the object 200, when the generated reflectance ratio P of the reflected light r' changes, it indicates the incident angle θ of the reflected light r' is also changed, thereby determining that the object 200 under sensing has a three-dimensional surface, thus preventing others from cracking the fingerprint recognition system with fingerprint images or pictures, and greatly increasing the security and recognition capabilities of the fingerprint recognition system.

Figure 7:
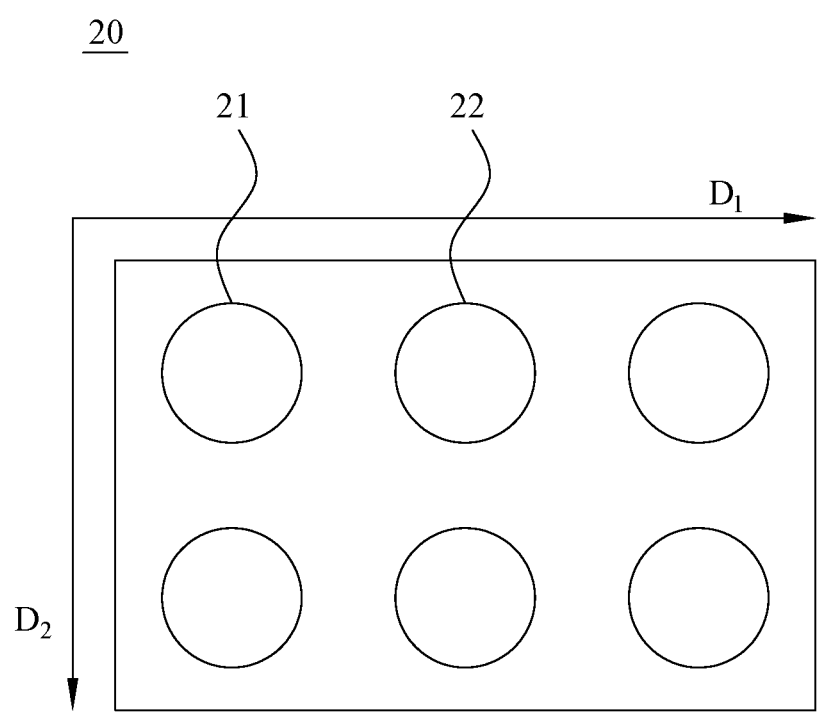
FIG. 7 is a schematic view of a light emitter according to a second embodiment of the present invention.
Figure 8:
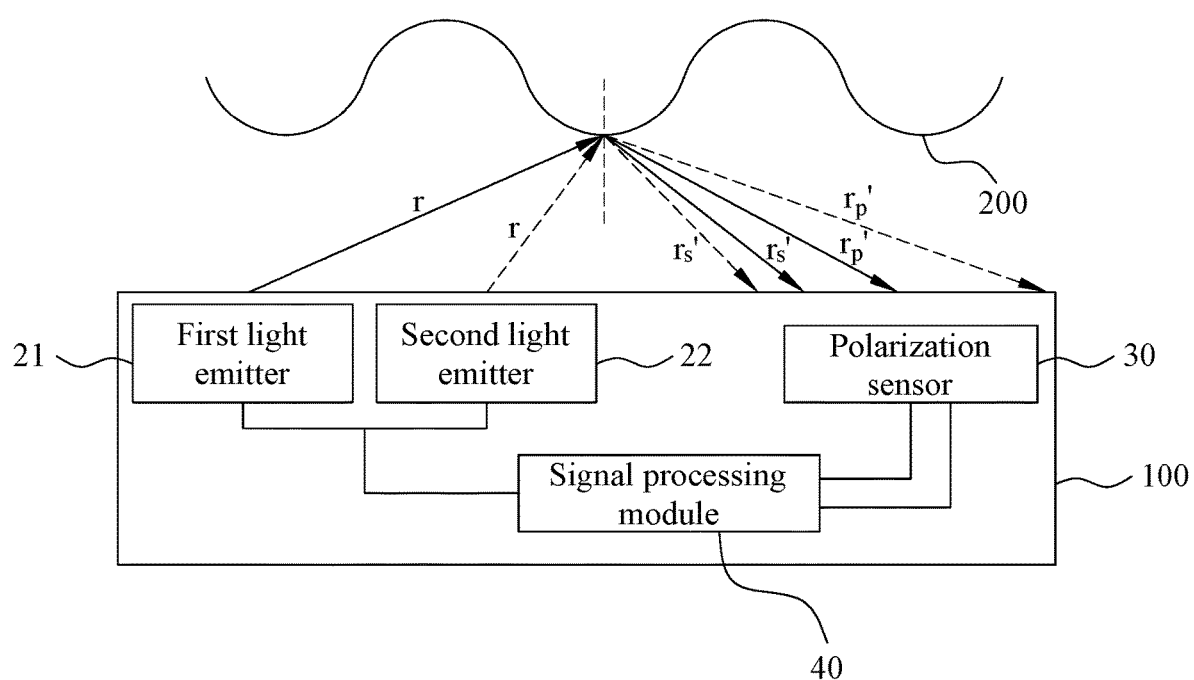
FIG. 8 is a schematic view of the biometric sensing system of the second embodiment of the present invention recognizing the surface of a three-dimensional object under sensing.

Referring to FIG. 7 and FIG. 8, FIG. 7 is a schematic view of a light emitter according to a second embodiment of the present invention; FIG. 8 is a schematic view of the biometric sensing system of the second embodiment of the present invention recognizing the surface of a three-dimensional object under sensing. Compared with the first embodiment, the second embodiment differs in the main structure in that, as shown in FIG. 7, the light emitter 20 has a plurality of light emitting units, and the light emitting units are disposed along a first direction D1 and a second direction D2 in an array format. The light emitting units include a first light emitting unit 21 and a second light emitting unit 22. The first light emitting unit 21 and the second light emitting unit 22 respectively emit at least one emitted light r to change the incident angle of the emitted light r, causing the emitted light r emitted by the first light emitting unit 21 to produce a first reflectance ratio P1 (not shown), and the emitted light r emitted by the second light emitting unit 22 produces a second reflectance ratio P2 (not shown). By increasing the variables of the biometric sensing system 100 during sensing and using these changes, the accuracy of determining whether the object 200 under sensing is three-dimensional is improved, thereby enhancing the accuracy of the biometric sensing system 100, however, the present invention is not limited to the above.

It should be further explained that, as shown in FIG. 4C, if the incident angle θ between the reflected light changes very little, the changes in the reflectance ratio P generated by the first reflectance $R_s$ and the second reflectance $R_p$ will be less obvious. Therefore, the signal processing module 40 may determine the surface of a three-dimensional object 200 to be flat, so that the fingerprint recognition system cannot be unlocked. However, it can be seen from the above description that the second embodiment not only achieves the same effects of the first embodiment, but also provide a different structure, and the second embodiment can generate the first reflectance ratio P1 and the second reflectance ratio P2 through the arrangement of a plurality of light emitting units, so as to increase the varieties of the biometric sensing system 100 according to the present invention. In some cases, there may be an insignificant change in the first reflectance ratio P1, but the change in the second reflectance ratio P2 is quite obvious. Therefore, through the arrangement of a plurality of light emitting units, it is effective to solve the above-mentioned special cases wherein the non-obvious change in reflectance ratio P may cause the signal processing module 40 to determine the three-dimensional object 200 as a flat surface, and the fingerprint recognition system cannot be effectively unlocked, which is inconvenient for the user.

It is worth mentioning that although the above description is based on the first light emitting unit 21 and the second light emitting unit 22, the angle of incidence is changed to increase the variety and data amount of the biometric sensing system 100. However, the present invention is not limited to this. Other variables, such as wavelength, intensity, emission frequency, and so on, can be used as variables for the comparison in the biometric sensing system 100. When the biometric sensing system 100 according to the present invention uses one of the variables in some cases, there may be no obvious difference in the change of the reflectance ratio P, but when using another variable, the change in the reflectance ratio P may have a very obvious difference, so as to increase the accuracy when determining whether the object 200 is three-dimensional, thereby improving the accuracy of the biometric sensing system 100.

Figure 9:
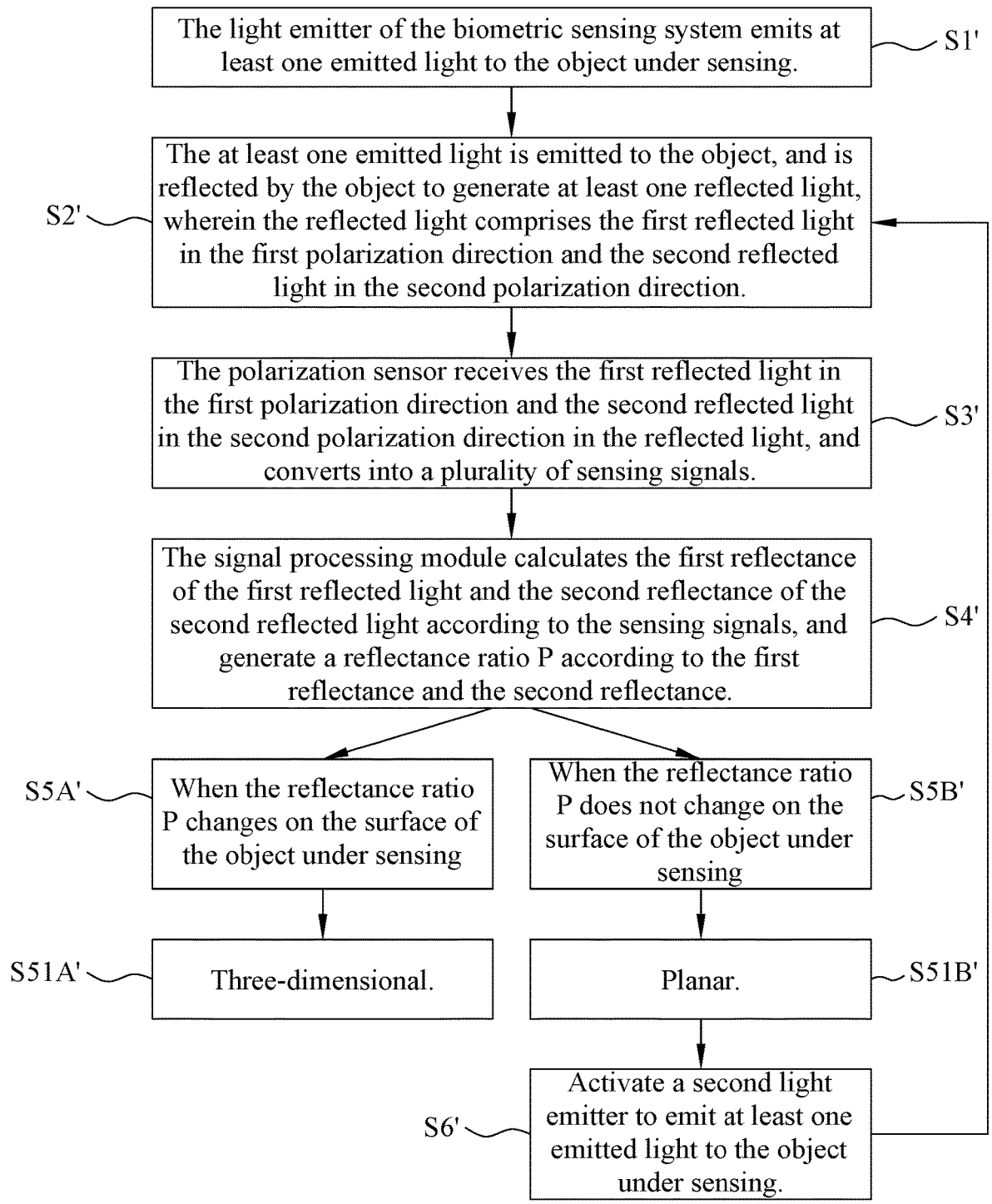
FIG. 9 is a flowchart illustrating the steps of performing the sensing method of the biometric sensing system according to the second embodiment of the present invention.

Referring to FIG. 9 as well as FIG. 8, FIG. 9 is a flowchart illustrating the steps of performing the sensing method of the biometric sensing system according to the second embodiment of the present invention. Based on the biometric sensing system 100 of the second embodiment, the present invention further provides a sensing method of the biometric sensing system 100, which includes the following steps:

Step SP: The light emitter 20 of the biometric sensing system 100 emits at least one emitted light r to the object under sensing 200. The light emitter can use a laser beam or an LED beam as the emitted light r, so the wavelength of the emitted light r emitted by the light emitter 20 may be between 360 nm and 1550 nm.

Step S2': The at least one emitted light r is emitted to the object 200, and is reflected by the object 200 to generate at least one reflected light r', wherein the reflected light r' comprises the first reflected light $r_s'$ in the first polarization direction and the second reflected light $r_p'$ in the second polarization direction. In the present embodiment, the first polarization direction is perpendicular to the incident direction, and the second polarization direction is parallel to the incident direction. However, the present invention is not limited to the above.

Step S3': The polarization sensor 30 receives the first reflected light $r_s'$ in the first polarization direction and the second reflected light $r_p'$ in the second polarization direction in the reflected light r', and converts the first reflected light $r_s'$ and the second reflected light $r_p'$ into a plurality of sensing signals.

Step S4': The signal processing module 40 calculates the first reflectance R of the first reflected light and the second reflectance $R_p$ of the second reflected light according to the sensing signals, and generate a reflectance ratio P according to the first reflectance R and the second reflectance $R_p$, wherein the first reflectance $R_s$ and the second reflectance $R_p$ are related to the incident angle θ.

Step S5A': The changes in the reflectance ratio P indicate a change in the incident angle θ of the emitted light r.

Step S51A': The signal processing module 40 determines that the object 200 is three-dimensional.

Step S5B': A constant reflectance ratio P indicates that the incident angle θ of the incident light r does not change.

Step S51B': The signal processing module 40 determines that the object 200 is planar.

Step 6': When the signal processing module 40 determines that the object 200 under sensing is planar, the second light emitting unit 22 is activated to emit at least one emitted light r to the object 200 under sensing, and return to step S2' to receive and repeat step S3' and the step S4' as well.

Thus, the biometric recognition system 100 according to the second embodiment of the present invention uses the first light emitting unit 21 and the second light emitting unit 22 to respectively emit at least one emitted light r to the object 200 by changing the incident angle of the emitted light r to cause the emitted light r of the first light emitting unit 21 to produce a first reflectance ratio P1, and the emitted light r of the second light emitting unit 22 to produce a second reflectance ratio P2, thereby increasing the variety and data amount of the biometric sensing system 100 according to the present invention, which effectively improves the accuracy of the biometric sensing system 100, while increasing the cost and system recognition time, so as to provide different options for different applications.

In summary, the characteristics of the present invention and the expected effects are stated as follows:

First, the present invention uses the polarization sensor 30 to sense the first reflected light $r_s'$ in the first polarization direction and the second reflected light $r_p'$ in the second polarization direction in the reflected light r', thereby eliminating noise in the environment and increasing the contrast of fingerprint images.

Second, the present invention uses the first reflectance $R_s$ and the second reflectance Rp calculated by the signal processing module 40, and uses the change in the reflectance ratio P to determine whether the object 200 is three-dimensional. As a result, the present invention effectively prevents others from cracking the fingerprint recognition system with fingerprint images or pictures, and greatly increases the security and recognition capabilities of the fingerprint recognition system.

Third, by using the biometric sensing system 100 of the present invention and the sensing method thereof, the user can use any unpolarized light beam as the emitted light r, so the emitted light r does not need to be limited to any specific emitted light to achieve reducing costs and improving applicability.

Fourth, the present invention uses a plurality of light emitting units to generate a plurality of reflectance ratios P to increase the variety and data amount when the signal processing module 40 determines whether the object 200 is flat, and effectively enhances the accuracy of the biometric sensing system 100.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A biometric sensing system, comprising:
   a light emitter emitting at least one emitted light to an object under sensing, the object under sensing reflecting the at least one emitted light to generate at least one reflected light, the at least one reflected light including a first reflected light having a first polarization direction and a second reflected light having a second polarization direction;

a polarization sensor electrically connected to the light emitter, the polarization sensor having a first polarizer and a second polarizer, the polarization sensor receiving the first reflected light in the first polarization direction and the second reflected light in the second polarization direction, and converting the at least one reflected light into a plurality of sensing signals, wherein the first polarizer and the second polarizer are arranged in a staggered layout, a first reflection angle exists between the first reflected light and the object under sensing, and a second reflection angle exists between the second reflected light and the object under sensing; and a signal processing module coupled to the light emitter and the polarization sensor, and the signal processing module calculating a first reflectance of the first reflected light and a second reflectance of the second reflected light according to the sensing signals, and generating a reflectance ratio according to the first reflectance and the second reflectance;

wherein the first reflectance is related to the first reflection angle, and the second reflectance is related to the second reflection angle.

2. The biometric sensing system according to claim 1, wherein the light emitter comprises a plurality of light emitting units, and the light emitting units are arranged along a first direction.

3. The biometric sensing system according to claim 1, wherein the light emitter comprises a plurality of light emitting units, and the light emitting units are arranged in an array along a first direction and a second direction.

4. The biometric sensing system according to claim 1, wherein when the first reflectance and the second reflectance vary with the first reflection angle and the second reflection angle, the signal processing module determines that a surface of the object under sensing is three-dimensional, otherwise, the signal processing module determines that the surface of the object under sensing is planar.

5. The biometric sensing system according to claim 1, wherein the first polarization direction is perpendicular to the second polarization direction.

6. The biometric sensing system according to claim 1, wherein the at least one emitted light emitted by the light emitter has a wavelength between 360 nm and 1350 nm.

7. The biometric sensing system according to claim 1, wherein the at least one emitted light emitted by the light emitter has a wavelength between 360 nm and 860 nm.

8. The biometric sensing system according to claim 1, wherein the signal processing module is one of a server, a computer, and an integrated circuit.

9. The biometric sensing system according to claim 1, wherein the first polarizer and the second polarizer are made of one of birefringent crystals or metal gratings.

10. The biometric sensing system according to claim 1, wherein the polarization sensor comprises metal gratings and a distance between two adjacent metal lines in the metal gratings is smaller than one half of a wavelength of the at least one emitted light.

11. A sensing method applicable to a biometric sensing system, comprising the steps of:

using a light emitter to emit at least one emitted light to an object under sensing, the object under sensing reflecting the at least one emitted light to generate at least one reflected light, the at least one reflected light including a first reflected light having a first polarization direction and a second reflected light having a second polarization direction;

using a polarization sensor to receive the first reflected light in the first polarization direction and the second reflected light in the second polarization direction and converting the at least one reflected light into a plurality of sensing signals; and using a signal processing module coupled to the light emitter and the polarization sensor to calculate a first reflectance of the first reflected light and a second reflectance of the second reflected light according to the sensing signals, and generate a reflectance ratio based on the first reflectance and the second reflectance;

wherein when the reflectance ratio changes with a surface of the object under sensing, the signal processing module determines that the surface of the object under sensing is three-dimensional, otherwise the signal processing module determines that the surface of the object under sensing is planar, and the method further activates a light emitting unit to emit at least another emitted light to the object under sensing when the signal processing module determines that the surface of the object under sensing is planar.

12. The sensing method according to claim 11, wherein the light emitter comprises a plurality of light emitting units, and the light emitting units are arranged along a first direction.

13. The sensing method according to claim 11, wherein the light emitter comprises a plurality of light emitting units, and the light emitting units are arranged in an array along a first direction and a second direction.

14. The sensing method according to claim 11, wherein the first polarization direction is perpendicular to the second polarization direction.

15. The sensing method according to claim 11, wherein the at least one emitted light emitted by the light emitter has a wavelength between 360 nm and 1350 nm.

16. The sensing method according to claim 11, wherein the at least one emitted light emitted by the light emitter has a wavelength between 360 nm and 860 nm.

17. The sensing method according to claim 11, wherein the polarization sensor comprises a first polarizer and a second polarizer, and the first polarizer and the second polarizer are arranged in a staggered layout.

18. The sensing method according to claim 17, wherein the first polarizer and the second polarizer are made of one of birefringent crystals or metal gratings.

19. The sensing method according to claim 11, wherein the polarization sensor comprises metal gratings and a distance between two adjacent metal lines in the metal gratings is smaller than one half of a wavelength of the at least one emitted light.

* * * * *